United States Patent [19]

Moody et al.

[11] Patent Number: 4,527,328

[45] Date of Patent: Jul. 9, 1985

[54] PORTABLE MASS TERMINATION TOOL

[75] Inventors: Roy A. Moody, Flossmoor; Peter Kirsinas, Country Club Hills; James A. Turek, LaGrange, all of Ill.

[73] Assignee: Panduit Corp., Tinley Park, Ill.

[21] Appl. No.: 453,669

[22] Filed: Dec. 27, 1982

[51] Int. Cl.³ .................... B23P 19/04

[52] U.S. Cl. .................... 29/749; 29/750; 29/751; 29/758; 29/761; 29/715; 29/566.1

[58] Field of Search .................... 29/749-754, 29/758, 761, 861, 867, 866, 707-709, 715, 717, 718, 566.1; 339/97-99; 72/451

[56] References Cited

U.S. PATENT DOCUMENTS

| | | | |
|---|---|---|---|
| 3,284,885 | 11/1966 | Fisher et al. | 29/749 |
| 3,845,535 | 11/1974 | Over | 29/203 |
| 4,005,516 | 2/1977 | Bakermans | 29/749 |
| 4,109,370 | 8/1978 | Quigley | 29/749 |
| 4,164,812 | 8/1979 | Dragisic | 29/749 |
| 4,176,441 | 12/1979 | Hafner | 29/566.1 |
| 4,242,792 | 1/1981 | Kirsinas, Jr. | 29/857 |

OTHER PUBLICATIONS

Methode Electronics, Inc., Interconnection City News Digest, AMP Catalog No. 77-451, Rev. 12-78.

*Primary Examiner*—Howard N. Goldberg
*Assistant Examiner*—P. W. Echols
*Attorney, Agent, or Firm*—Charles R. Wentzel; Mark D. Hilliard

[57] ABSTRACT

A portable tool for simultaneously terminating a plurality of conductors in a mass termination, insulation displacement connector. The connector is positioned in a connector holder mounted on a wiring board. The tool includes structure for detachably mounting the tool on the connector holder. The tool also includes an insertion assembly which reciprocates relative to the holder for moving the conductors to terminate them in the connector. The mounting structure includes locking structure for locking the tool to the holder only prior to termination of the conductors. Thus the operator is prevented from inadvertently removing the tool from the holder prior to conductor termination.

17 Claims, 16 Drawing Figures

PORTABLE MASS TERMINATION TOOL

BACKGROUND OF THE INVENTION

The present invention relates to tools for terminating conductors and more particularly to a portable tool for simultaneously terminating a plurality of conductors in a mass termination connector.

Mass termination connectors, which function to remove insulation from and electrically terminate a plurality of conductors in response to a single stroke of an insertion tool, are coming into increasing commercial prominence because of their great savings of tedious manual operations compared with the previous wiring method of stripping the insulation from the end of each individual conductor, placing a terminal on each bared conductor end and crimping the respective terminals on the respective conductors. A mass termination connector, an example of which is fully disclosed in commonly assigned U.S. Pat. No. 4,191,442, includes a housing having a front wall and a back wall joined by a plurality of spaced barrier walls defining an array of cavities for holding a plurality of individual metallic terminal elements. Aligned openings in the front and back walls extend from the wire-receiving face of the housing to provide entrances to the various cavities so that conductors positioned over the cavities can be moved laterally of their axes to terminate them in the terminal elements.

Various types of tools have been proposed for inserting the conductors into the mass termination connectors. The simplest type is of the hand variety having an enlarged head, no moving parts and which can terminate only one wire at a time. Pneumatic gun-type tools have been suggested which hold and index the connector to terminate one wire at a time. Such tools are not well suited for use with conductors positioned on a wiring layout board because of their modest insertion rates or because the conductors must be lifted from the board and positioned in the tool.

Portable tools have also been suggested for use with connector holders disposed on a wiring layout board at locations corresponding to the desired ends of the wiring harness to be formed. Such tools function to sever the excess portions of the conductors extending from the connector as they terminate all the conductors simultaneously. A common shortcoming of such tools is that they fail to provide a positive indication that the tool has fully terminated the wires in the connector. Thus if the operator is in a particular hurry or is inattentive, he or she may fail to properly operate the tool to complete the termination. As the tool unlocks from the holder in the same manner whether or not the termination has been completed, the operator has no indication that a particular termination may be incomplete. In the case of a pneumatic tool, the operator could "tickle" the trigger rather than holding it sufficiently long to complete the termination. These prior art tools also require that after termination the tool must be unlocked from the connector holder before removal of the tool. Reference may be made to U.S. Pat. Nos. 3,845,535 and 4,242,792.

SUMMARY OF THE INVENTION

Among the several objects of the present invention may be noted the provision of an improved portable tool for simultaneously terminating conductors in a mass termination, insulation displacement connector; the provision of such a tool which cannot be inadvertently removed from the holder prior to completion of the termination; the provision of such a tool which automatically releases from the holder upon completion of termination to allow the operator to directly remove the tool from the holder without first performing another operation such as manually releasing the latch means or tilting the tool with respect to the holder; the provision of such a tool which prevents operation of the tool prior to proper mounting of the tool on the holder; the provision of such a tool which prevents mounting on the holder unless cutter means carried by the holder and the tool are in proper alignment; and the provision of such a tool which is light in weight, has long service life and is simple and economical to manufacture. Other objects and features of the present invention will be in part apparent and in part pointed out hereinafter in the specification and in the claims.

Briefly, the portable tool of the present invention includes means for detachably mounting the tool on the connector holder and an insertion assembly which reciprocates relative to the holder for moving the conductors to terminate them in the connector. The mounting means include locking means for locking the tool to the holder only prior to completion of termination of the conductors in the connector so that the operator is prevented from inadvertently removing the tool from the holder prior to conductor termination.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
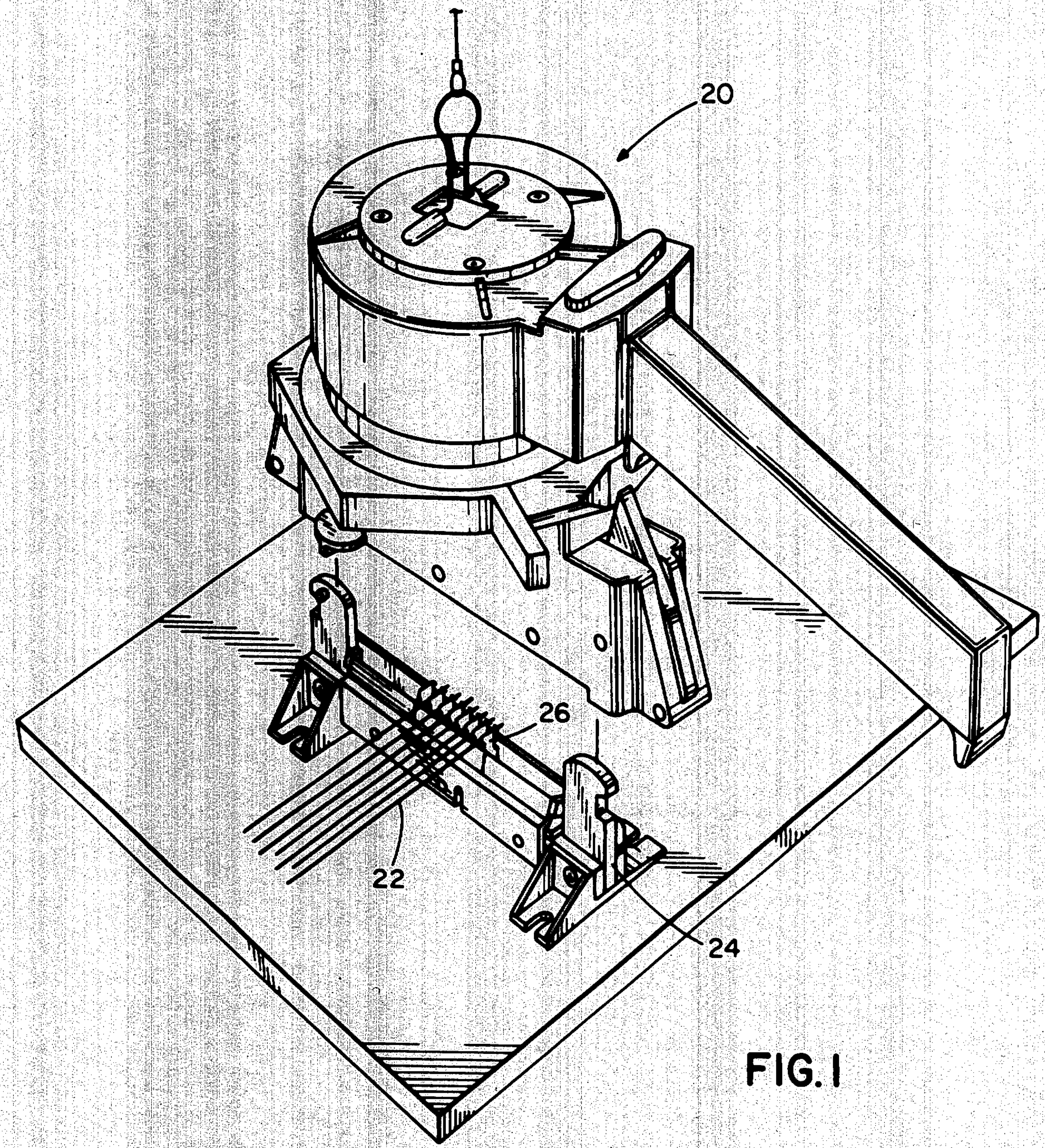
FIG. 1 is a perspective view of a portable tool of the present invention, for terminating conductors in a mass termination connector, prior to mounting on a connector holder.

Referring now to the drawings, a portable termination tool for terminating conductors 22 in a mass termination, insulation displacement connector 26 positioned in a connector holder 24 which in turn is mounted on a panel board or wiring board, is generally indicated in FIG. 1 by reference numeral 20. The holders 24 are mounted on the wiring board at positions analogous to the desired ends or breakout points of a wiring bundle to be formed by conductors 22.

Figure 2:
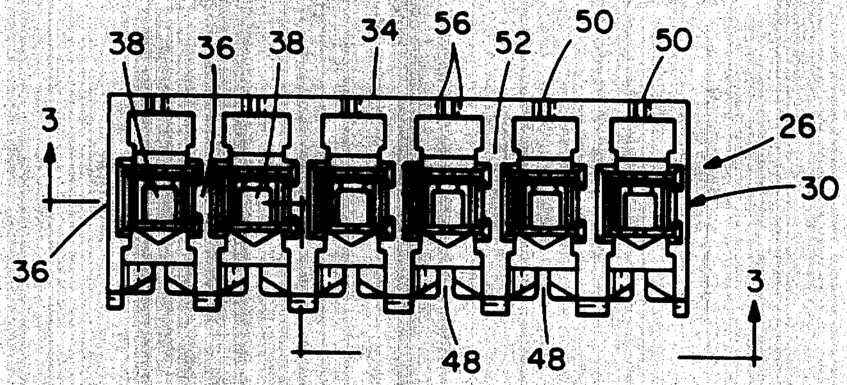
FIG. 2 is a plan view of a mass termination connector for use with the tool of FIG. 1.
Figure 3:
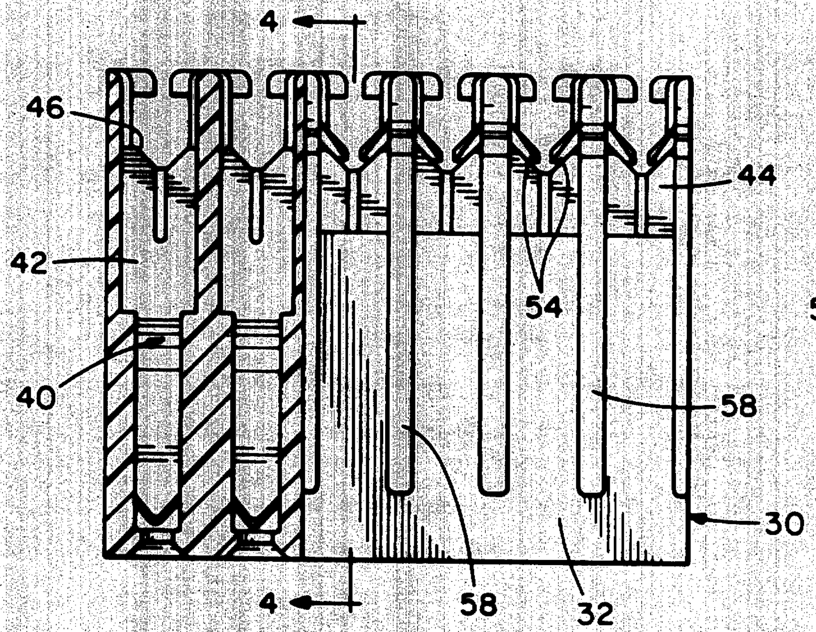
FIG. 3 is a partial sectional view of the connector taken generally along line 3—3 of FIG. 2.
Figure 4:
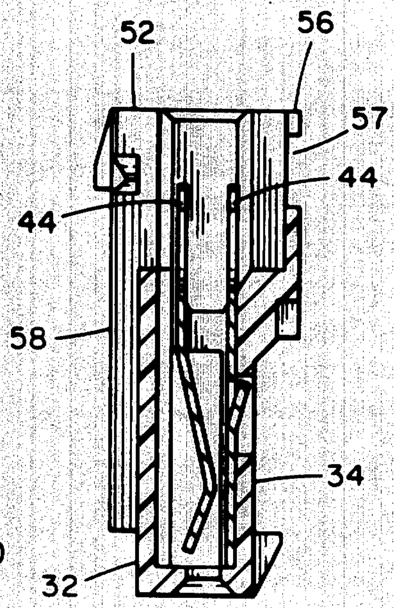
FIG. 4 is a sectional view of the connector taken generally along line 4—4 of FIG. 3.

A mass termination connector similar to connector 26, best shown in FIGS. 2–4, is fully shown and described in commonly assigned U.S. Pat. No. 4,191,442. The connector comprises a housing 30 including a front wall 32, a rear wall 34, and a plurality of regularly spaced barrier walls 36 joining the front and rear walls which together define an array of cavities 38. Positioned in each cavity is a metallic terminal element 40 including a self-stripping wire-receiving portion 42. The wire-receiving portion includes a pair of spaced slotted plates 44 each having an entrance 46 for guiding a wire into the slot. It will be appreciated that a conductor positioned over the entrances and moved laterally of its axial direction into the slots will have its insulation displaced by the plate sections defining the slots resulting in electrical termination of the conductor in the terminal element. The front and rear walls each have a series of aligned openings 48 and 50, respectively, extending from a wire-receiving face 52 of the connector housing for permitting access of the various conductors to their corresponding terminal elements.

The front wall 32 includes sets of opposed resilient ears 54 extending into each front wall opening 48 to define a constricted throat to each opening. Similarly rear wall 50 comprises sets of opposed resilient ears 56 extending into each rear wall opening 50 to define constricted throats. Respective sets of ears 54 and 56 as well as portions of plates 44 defining entrances 46 cooperate to deflect a conductor 22 out of its as-manufactured axial direction and constitute means for mechanically holding each conductor in alignment with a respective cavity prior to termination of the conductor. Rear wall 34 includes a slot 57, best shown in FIG. 4, underlying ears 56 for receiving a cutter means carried by the holder while front wall 32 includes spaced ribs 58.

Figure 5:
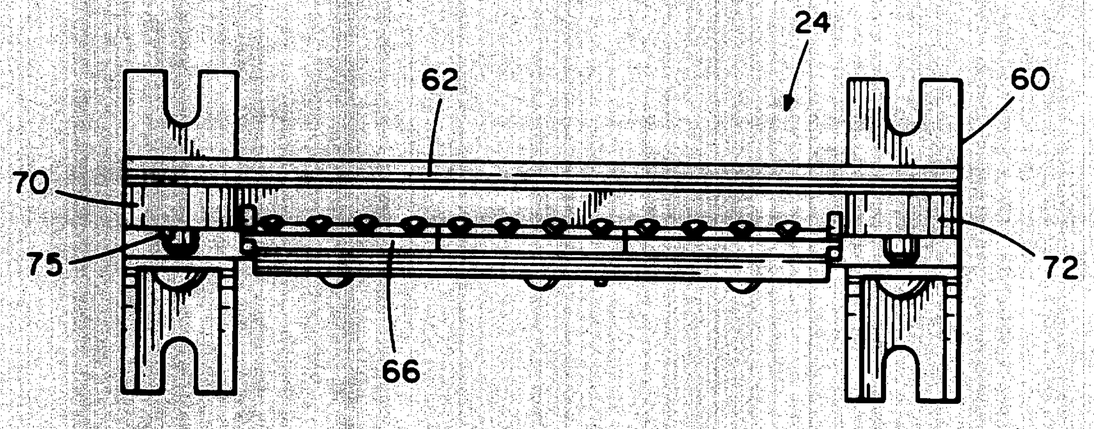
FIG. 5 is a plan view of a connector holder for use with the tool of FIG. 1.
Figure 6:
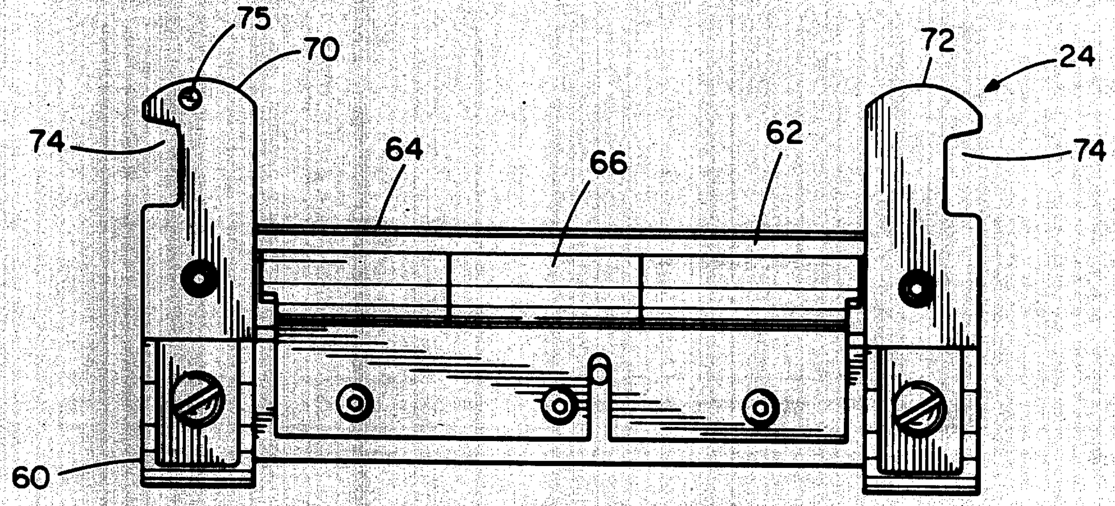
FIG. 6 is a front elevational view of the holder.
Figure 7:
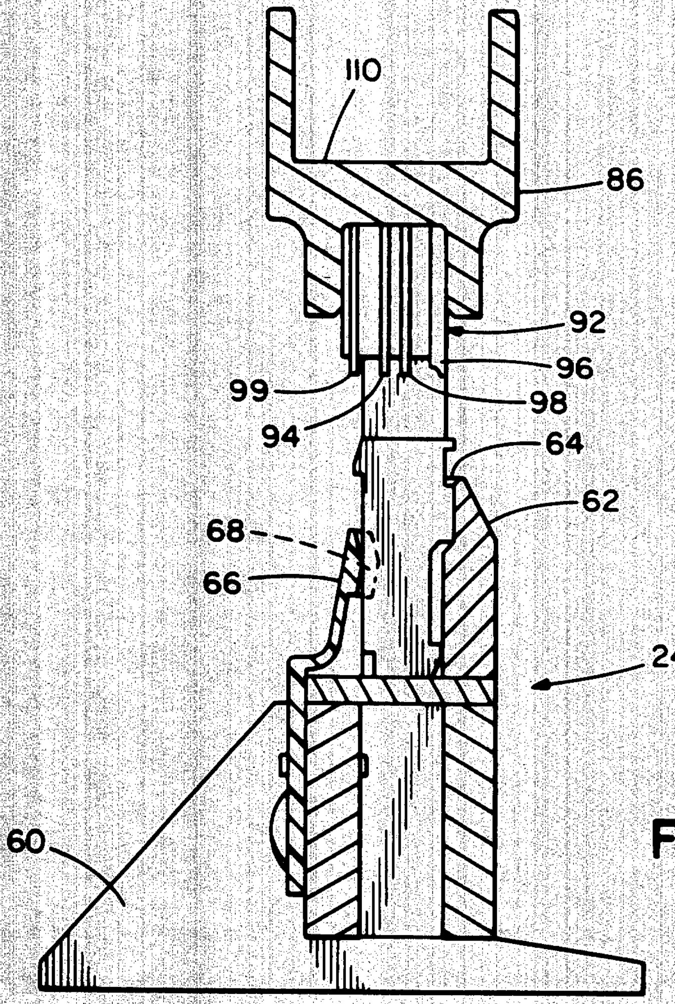
FIG. 7 is a side elevational view of the holder with certain components removed showing a connector positioned in the holder and an insertion assembly carried by the tool in position to terminate conductors in the connector.
Figure 8:
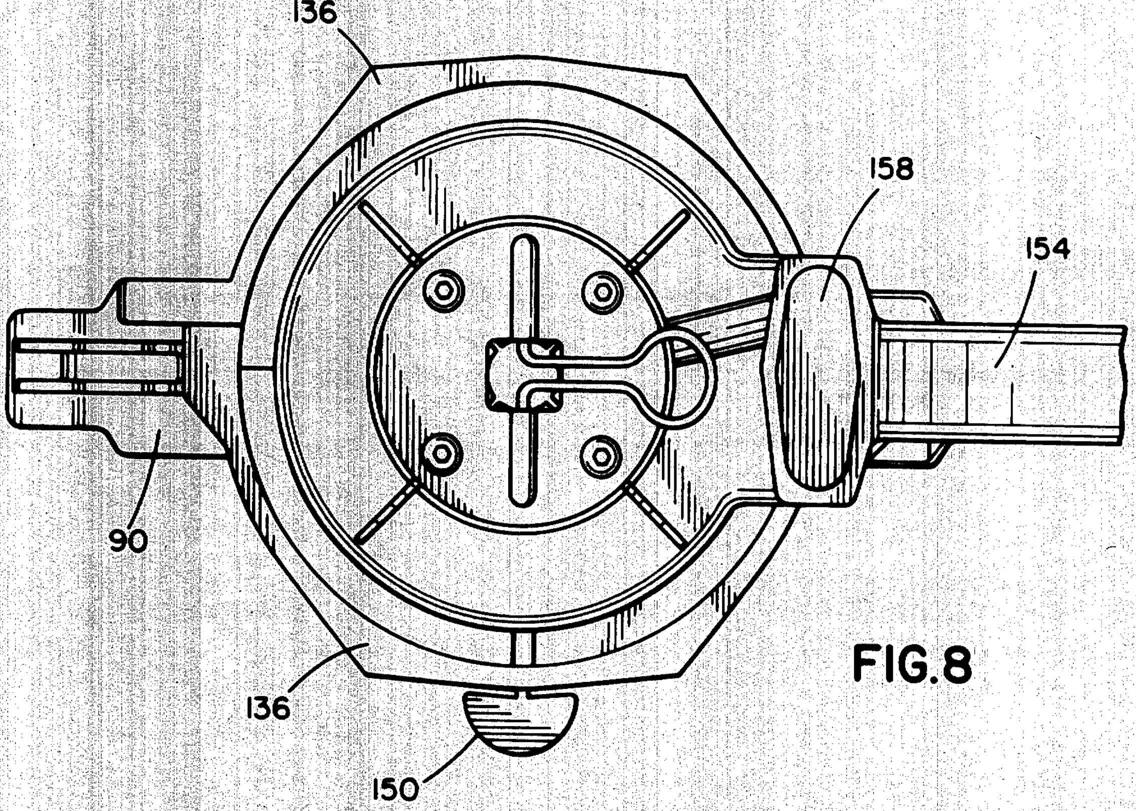
FIG. 8 is a plan view of the tool of FIG. 1.

Connector holder 24, best shown in FIGS. 5–7, which functions to hold one or more connectors end to end as well as to support the termination tool, includes a base 60 for attachment to the wiring board. Attached to the base is a fixed back support 62 including first cutter means in the form of a cutter bar 64 for reception in slot 57 formed in connector rear wall 34. Also carried by the base is a deflectable resilient segmented front wall 66 having inwardly directed spaced vertical fingers 68 for interdigitating with ribs 58 of the connector to preclude lateral movement of connector 26 relative to connector holder 24.

Flanking back support 62 and front wall 66 are a pair of posts 70, 72 for mounting tool 20. Each post has an undercut 74 for receiving pivotal latch means carried by tool 20, and each post has a different shape for functioning in concert with polarization means of the tool to insure that the tool can only be mounted on the holder in only one orientation—with second cutter means of the tool in alignment with cutter bar 64. More specifically only post 70 has a horizontal aperture receiving a pin 75 the ends of which extend from the post.

Figure 10:
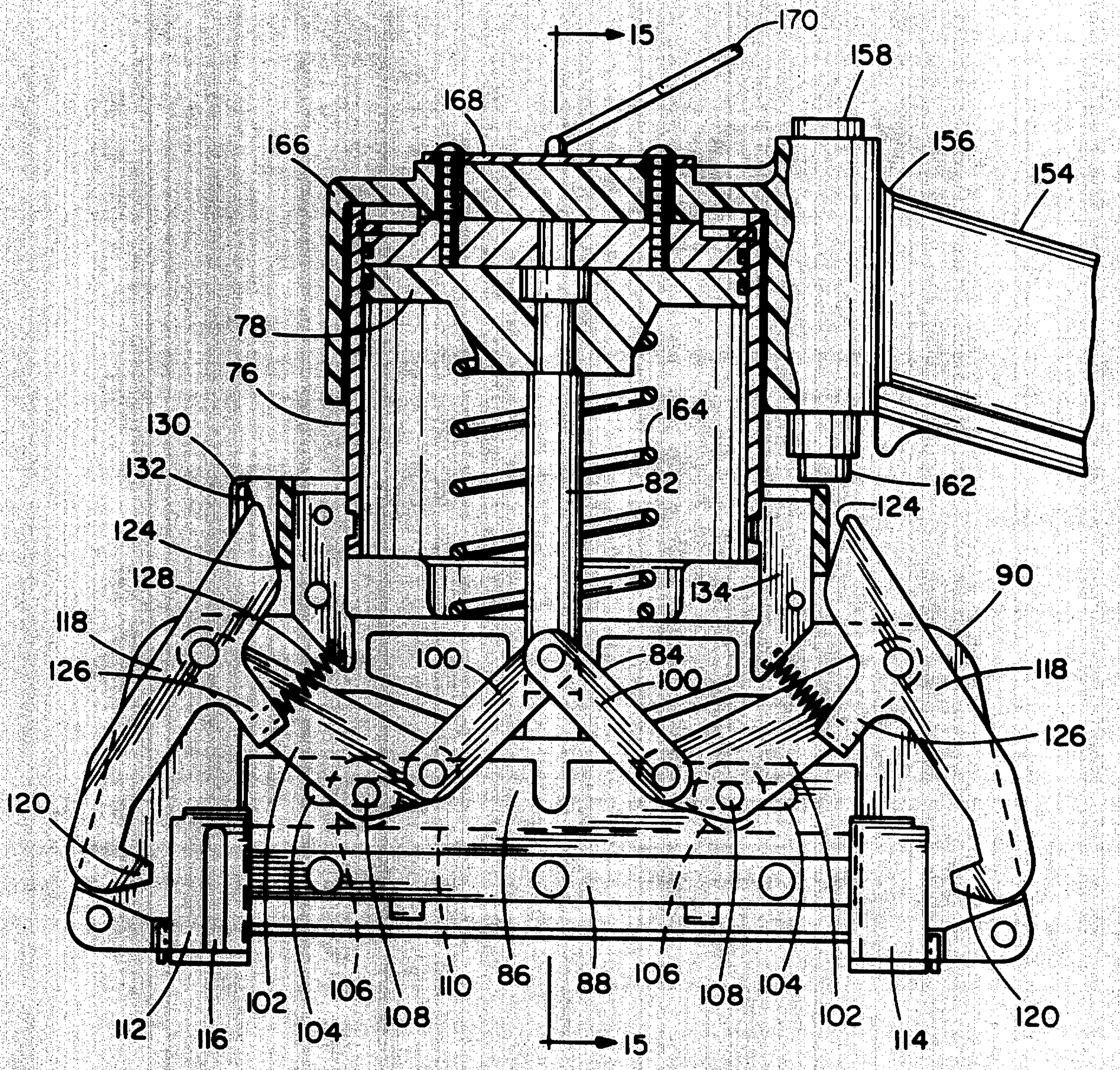
FIG. 10 is a sectional view of the tool showing a linkage assembly interconnecting the piston ram and the insertion assembly carriage, and latches for engaging the holder posts.

Referring to FIG. 10, portable termination tool 20 includes a prime mover in the form of a fluidic, and more specifically—a pneumatic, cylinder 76 having a piston 78 which carries a ram 82 connected by a linkage assembly 84 to a carriage 86 having an insertion assembly 88 which reciprocates relative to the holder for moving conductors 22 laterally of their axial direction to terminate them in connector 26. The tool also includes a housing 90 affixed to cylinder 76 and enclosing the linkage assembly and the insertion assembly. As best shown in FIG. 7, the insertion assembly includes a die 92 corresponding to each terminal element 40 of the connector. Each die includes four aligned fingers for moving a conductor into slotted plates 44. Fingers 94 and 96 flank plates 44 while intermediate finger 98 engages the conductor between the plates. Front finger 99 extends adjacent connector front wall 32 while rear finger 96 has a sharpened leading edge and constitutes second cutter means for cooperating with cutter bar 64 to trim the excess portion of the conductor during termination.

Figure 11:
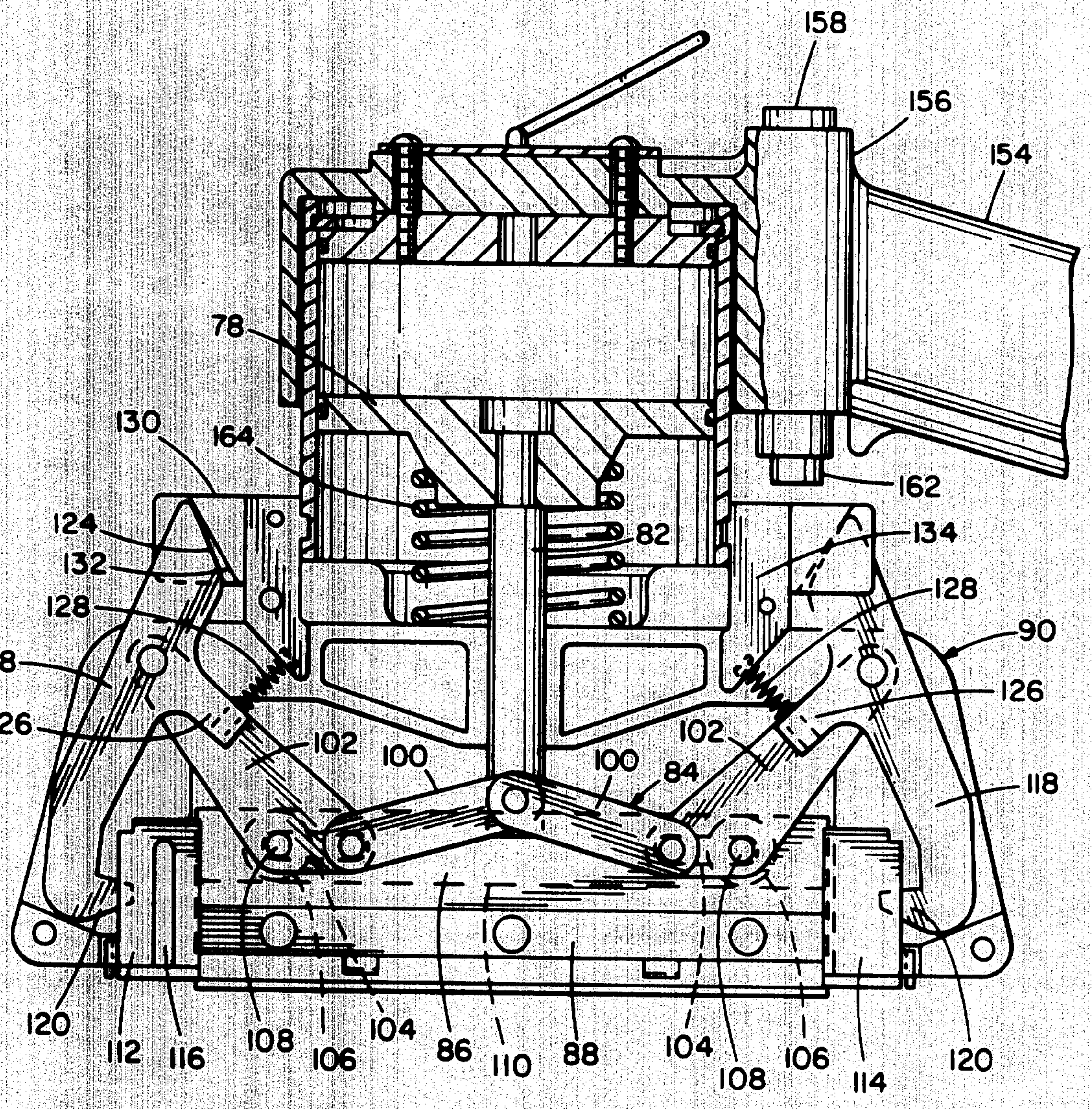
FIG. 11, similar to FIG. 10, illustrates the locking ring and the latches in their respective locking positions and the ram extended.

Linkage assembly 84 is of the knee toggle type and includes a pair of drive links 100 and a pair of driven links 102. The upper or first ends of the drive and driven links are pivotally connected to the ram and the housing, respectively, while the lower or second end of each drive link is pivotally connected to the second end of a corresponding driven link so that the linkage assembly is generally symmetrical about a plane extending in the longitudinal direction of ram 82. Carriage 86 has a pair of elongate apertures 104 extending transversely to the longitudinal direction of the ram and, adjacent their second ends, each driven link 102 pivotally carries a roller 106 by means of a pivot pin 108 received for movement in a corresponding aperture 104. The carriage has a roller surface 110 extending generally parallel to the longitudinal direction of aperture 104 for engagement by the peripheries of rollers 106 so that as the ram moves from its retracted position, shown in FIG. 10, the rollers 106 roll outwardly and exert a downward force on the carriage causing the insertion assembly to extend as shown in FIG. 11.

Figure 9:
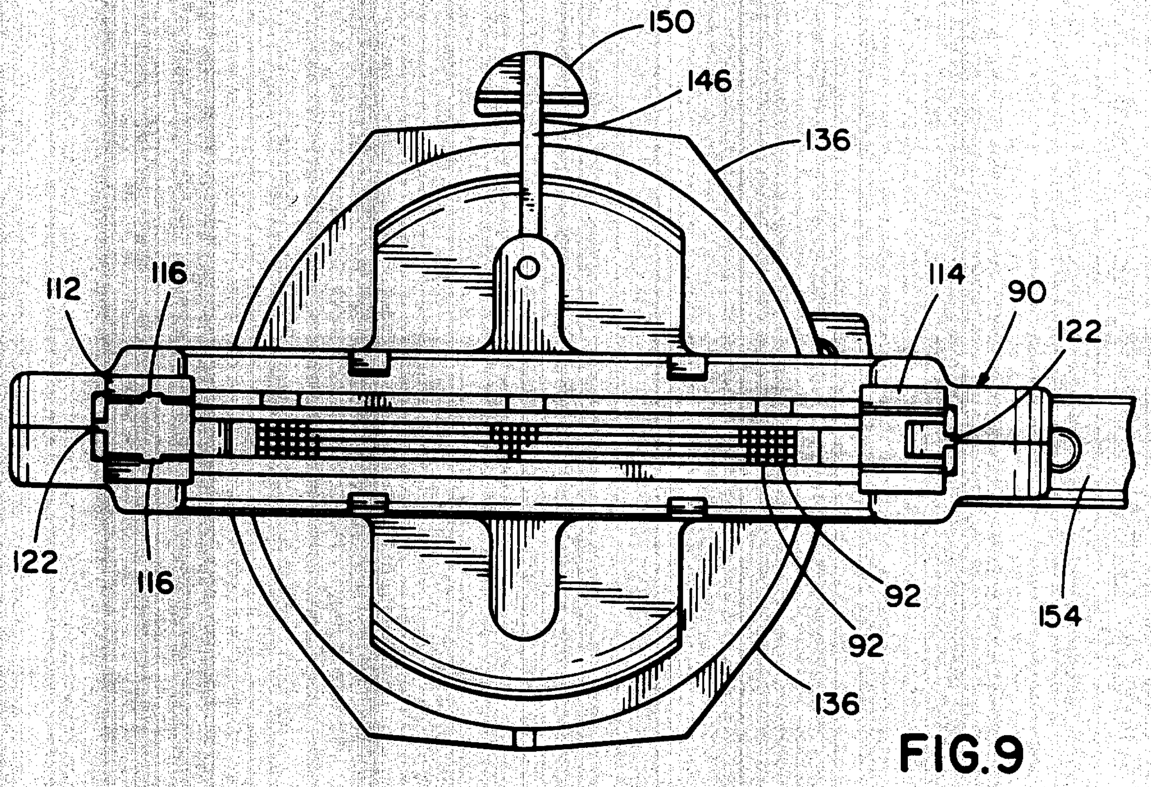
FIG. 9 is a bottom elevational view of the tool showing polarized sockets for receiving posts carried by the holder.

Portable tool 20 also comprises means for detachably mounting the tool on connector holder 24, locking means for locking the tool to the holder only prior to termination of the conductors in the connector, and release means responsive to insertion assembly 88 terminating the conductors to release the locking means. As best shown in FIGS. 9 and 10, housing 90 retains a pair of sockets or bushings 112, 114 for receiving posts 70, 72. The sockets are shaped complimentary to posts 70, 72 and constitute polarization means to permit mounting of the tool only with rear cutter fingers 96 in alignment with cutter bar 64. Only socket 112 is provided with slots 116 for receiving the ends of pin 75 retained by post 70. Upon attempted reverse mounting, the walls forming socket 114 would interfere with pin 75.

The mounting means comprises a pair of latches 118 with each latch pivotally connected to housing 90 intermediate its ends on a common pin with the first end of a corresponding driven link 102. One end of latch 118 has a hook 120 for reception through a window 122 in each socket into the undercut 74 of each post to mount the tool. The other end of each latch is provided with a cam follower surface 124. Latches 118 are movable between a release position, shown in FIG. 10, in which the tool can be placed on and removed from holder 24 and a locking position, shown in FIG. 11, in which hooks 120 engage posts 70, 72. Each latch has an auxiliary arm 126 acted upon by a compression spring 128 to bias the latch toward its release position.

Figure 12:
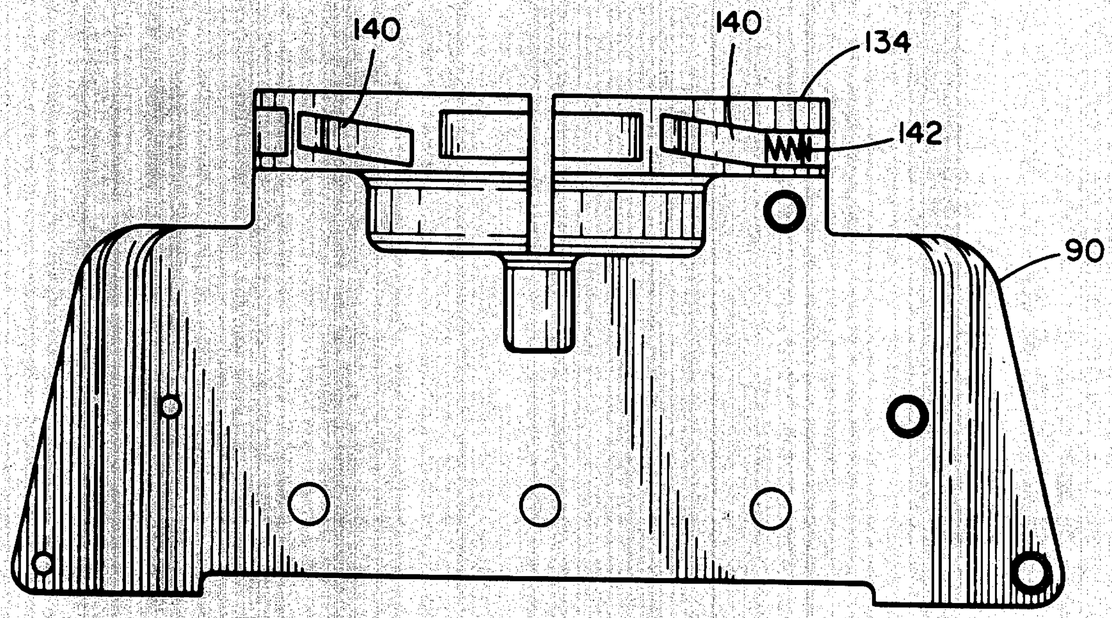
FIG. 12 is a front elevational view of one of a pair of halves which together form the tool housing.
Figure 13:
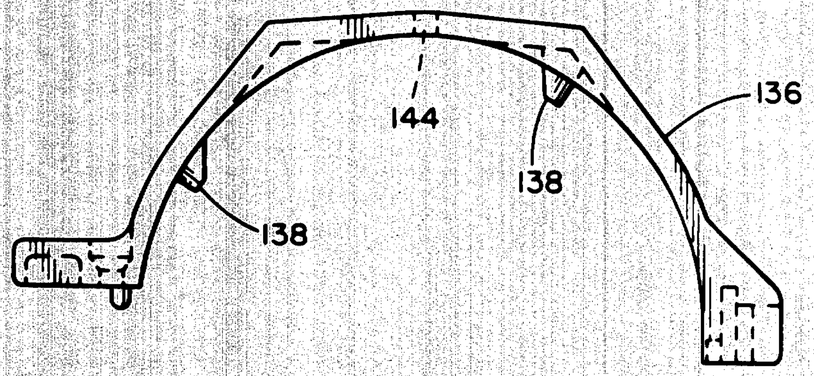
FIG. 13 is a plan view of one of a pair of halves which together form the locking ring carried by the housing for engaging the latches.
Figure 14:
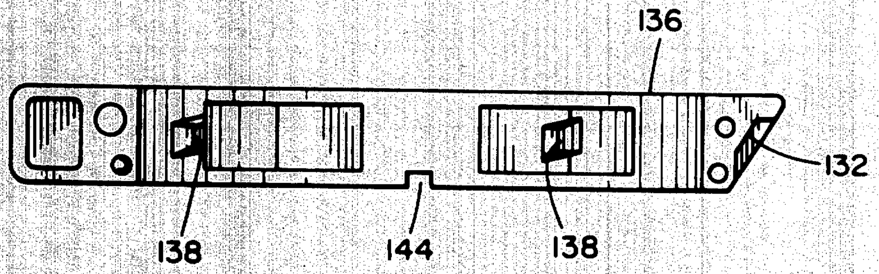
FIG. 14 is a front elevational view of the ring half of FIG. 12.

The locking means comprises a locking ring 130 having cam surfaces 132 for engagement with the cam follower surfaces 124 of latches 118. Housing 90 includes an annular retainer 134 for rotatably carrying ring 130. As best shown in FIGS. 13 and 14, ring 130 is formed by a pair of ring halves 136 each having a pin for reception in an aperture of the other in an interference fit to join the halves. The ring has a plurality of regularly spaced fingers 138 on its inner surface which are received in spaced inclined slots 140 on the periphery of retainer 134. Thus rotation of the ring causes it to move toward or away from latches 118. Ring 130 is movable between a release position, shown in FIG. 10, in which the ring does not move the latches and a locking position, shown in FIG. 11, wherein the ring has moved the latches to their locking positions. As shown in FIG. 12, a compression spring 142 is provided in one of the slots 140 to engage a corresponding finger 138 to bias locking ring 130 to its release position.

Figure 15:
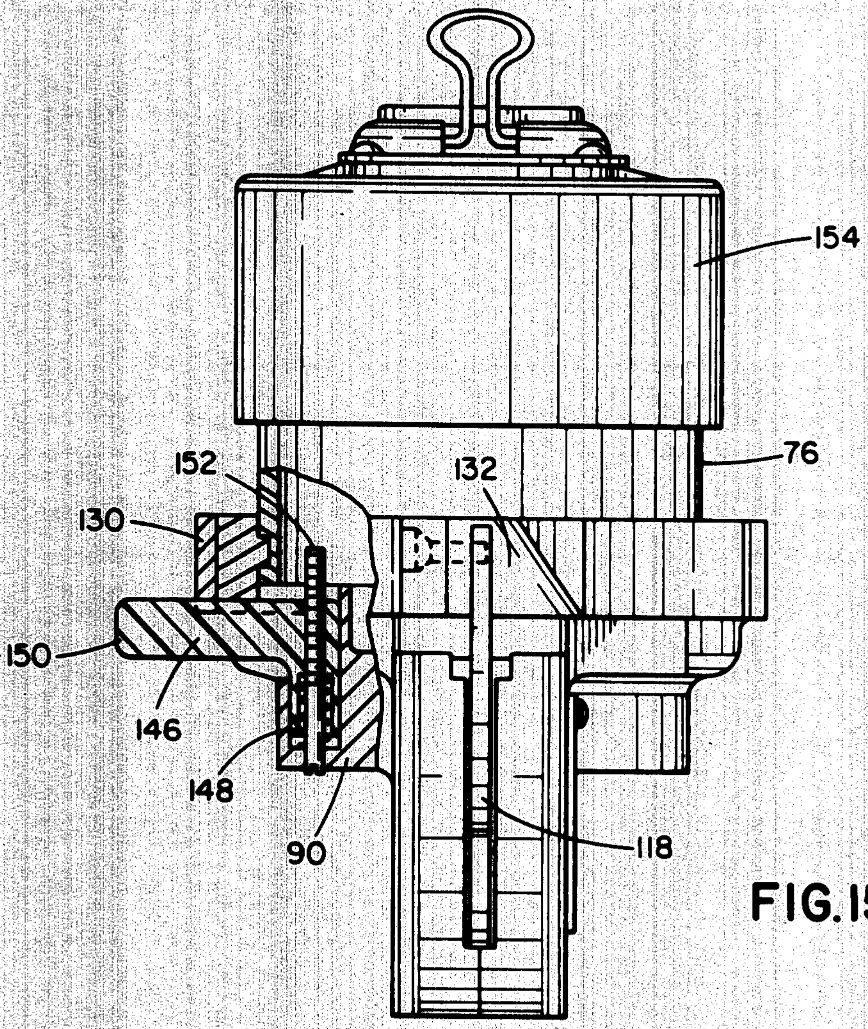
FIG. 15 is a partial sectional view taken generally along line 15—15 of FIG. 10 depicting a release for the locking ring.

The locking means further includes a lock assembly for holding the locking ring, once rotated to its locking position, in its locking position until the conductors have been terminated. The lock assembly, shown in FIG. 15, is slidably retained in housing 90 for movement toward and away from locking ring 130. The locking ring includes a slot 144, shown in FIG. 14, which becomes aligned with a locking bar 146 of the lock assembly when the ring is moved to its locking position. A compression spring 148 is provided to push the bar into the slot when alignment occurs. A manual override for the lock assembly is provided in the form of a finger-engageable extension 150 integral with bar 146. Thus in the event it is desired to unlock the tool prior to termination, movement of the extension of the bar against spring 148 permits the ring to return to its release position under the influence of springs 142 which in turn results in latches 118 moving to their release positions under the influence of springs 128.

The release means comprises a pin 152 having one end thereof retained by bar 146 and the other end thereof extending into cylinder 76 for engagement by piston 78 as the piston extends to terminate the conductors. Thus as the piston extends and engages pin 152, the pin moves locking bar 146 downwardly out of slot 144 resulting in release of the locking means.

Figure 16:
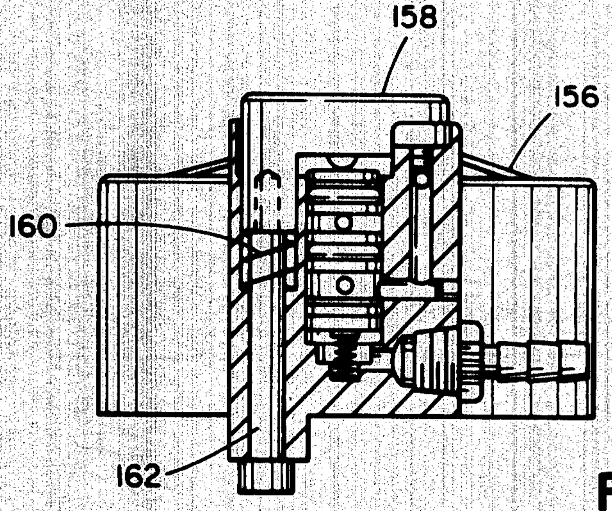
FIG. 16 is a sectional view of a trigger mechanism for the tool of the present invention.

Referring to FIGS. 10 and 16, tool 20 includes a handle assembly 154 housing an actuation assembly 156 for controlling operation of cylinder 76. The actuation assembly includes a slidable valve button 158 biased by a return spring 160 to its rest position shown in FIG. 10, an interlock component 162 attached to button 158 and extending from the handle assembly toward locking ring 130, and a valve assembly controlled by button 158 for selectively pressurizing the cylinder. In the interest of brevity, the valve means, air supply and air supply connections and related hardware are not fully shown as these are well known by those skilled in the art. Suffice to say that movement of button 158 to its actuation position causes pressure to be applied above piston 78 causing the piston to extend and effect termination of the conductors. Release of button 158 causes it to return to its rest position and results in the cylinder portion above the piston being exhausted so that the piston can retract under the influence of piston return spring 164.

When locking ring 130 is in its release position as shown in FIG. 10, it interferes with extension of interlock 162 to prevent movement of button to its actuation position. Thus tool 20 is prevented from inadvertent operation when it is not locked on holder 24. Of course with the release ring moved to its locking position, FIG. 11, sufficient clearance is afforded to permit movement of the button to its actuation position. Handle assembly 156 also includes a cylinder cap 166 attached to which is a plate 168 pivotally retaining a ring 170 for optional attachment to a counterbalance.

Operation of tool 20 is as follows:

With a plurality of connector holders 24 affixed on the wiring board at positions analogous to the desired ends of the wiring bundle to be formed, with connectors 26 loaded into the holders and with conductors 22 positioned for termination in the connectors; tool 20 is positioned over the first holder and moved directly toward the wiring board causing posts 70, 72 to be received in sockets 112, 114, respectively. Rotation of locking ring 130 from its release position causes cam surfaces 132 to move cam followers 124 resulting in latches 118 locking onto the holder posts. When the ring reaches its locking position (FIG. 11) locking bar 146 enters ring slot 144. Accordingly, the tool cannot be inadvertently removed prior to termination. If it is desired to remove the tool before termination, manual override extension 150 can be used.

With the locking ring moved downwardly to its locking position there is clearance to operate valve button 158 which causes piston 78 to extend resulting in insertion assembly 88 terminating the conductors in the connector. As piston 78 approaches its fully extended position it engages release pin 152 to cause locking bar 146 to move out of slot 144 at the same time that conductor termination is achieved. This permits locking ring 130 to return to its release position under the influence of springs 142 and latches 118 to move to their release positions under the influence of springs 128. Tool 20 is then in condition to be moved directly away from the wiring board and mounted on the remaining connector holders as described above until the wire harness is completed. However, if button 158 is merely teased (not held depressed long enough for piston 78 to fully extend to terminate the conductors) the piston will not engage release pin 152 and the ring will not unlock to permit the tool to be dismounted. Thus positive indication of an incomplete termination is provided. In prior art tools, after completion of termination the tool could not be moved directly from the mount as the operator was required to manually release latches or was required to tilt the tool before removal. It will be appreciated that such additional release operations consumed time and could become tedious if a large number of terminations were required.

In view of the above, it will be seen that the several objects of the invention are achieved and other advantageous results obtained.

As various changes could be made in the above constructions without departing from the scope of the invention, it is intended that all matter contained in the above description should be interpreted as illustrative and not in a limiting sense.

What is claimed is:

1. A portable tool for simultaneously terminating a plurality of conductors in a mass termination, insulation displacement connector positioned in a connector holder which is mounted on a wiring board or the like, said tool comprising:

means for detachably mounting said tool on said connector holder; and an insertion assembly which reciprocates relative to said holder for moving said conductors to terminate them in said connector, said mounting means comprising locking means for locking said tool to said holder only prior to termination of said conductors in said connector whereby the operator is prevented from inadvertently removing said tool from said holder prior to termination of said conductors.

2. A tool as set forth in claim 1 wherein said locking means has a manual override to permit the operator to intentionally remove said tool from said holder prior to conductor termination.

3. A tool as set forth in claim 1 wherein said mounting means further comprises release means responsive to said insertion assembly terminating said conductors to release said locking means whereby after termination the operator can directly remove said tool from said holder.

4. A tool as set forth in claim 3 wherein said holder comprises at least one mounting post and wherein said mounting means comprises a latch movable between a locking position wherein it engages said post and a release position wherein said tool can be removed from said holder, said latch being biased to said release position.

5. A tool as set forth in claim 4 wherein said tool includes a housing and said locking means comprises a locking ring rotatably retained by said housing, said latch including a cam follower and said ring having a cam surface, said ring being movable between a release position wherein said ring does not move said latch and a locking position wherein said ring has moved said latch to its locking position, said ring being biased to its release position.

6. A tool as set forth in claim 5 wherein said locking means further comprises a lock biased to extend into a slot in said ring when said ring is rotated to its locking position.

7. A tool as set forth in claim 6 in which said tool includes a fluidic cylinder and a piston having a rod connected thereto to reciprocate said insertion assembly, said release means comprising a release pin connected to said lock and positioned for engagement by the piston of said cylinder whereby, when the piston extends to cause termination of said conductors, said lock is removed from said slot allowing said ring and said latch to return to their release positions.

8. A tool as set forth in claim 7 wherein said cylinder has an actuation assembly including a component extending to engage said ring when the latter is in its release position, rotation of said ring to its locking position causing said ring to move away from said component so that said actuation assembly is inoperative when said ring is in its release position.

9. A tool as set forth in claim 1 wherein said connector includes a front wall, a back wall and a row of regularly spaced metallic terminal elements disposed between said walls with each element having a slotted plate for terminating a corresponding conductor, said connector holder carrying a first cutter means disposed on one side of said terminal elements, said insertion assembly comprising a second cutter means for cooperating with said first cutter means to sever excess portions of said conductors during operation of said tool.

10. A tool as set forth in claim 9 further comprising polarizing means to permit mounting of said tool on said holder only when said first and second cutter means are in alignment.

11. A tool as set forth in claim 10 wherein said holder comprises a pair of mounting posts flanking said connector with each post having a different shape, said polarizing means comprising a pair of sockets for receiving said posts and flanking said insertion assembly, each socket having an opening shaped complimentary to its corresponding post whereby said tool can be mounted on said holder in only one orientation.

12. A portable tool for simultaneously terminating a plurality of conductors in a mass termination, insulation displacement connector positioned in a connector holder which is mounted on a wiring board or the like, said tool comprising:

means for detachably mounting said tool on said connector holder;

an insertion assembly for moving said connectors to terminate them in said connector; and a prime mover for reciprocating said assembly relative to a connector disposed in said holder, said mounting means comprising locking means for locking said tool to said holder, said mounting means further comprising release means responsive to said assembly terminating said conductors to release said locking means whereby, upon completion of termination, said tool can be removed from said holder without the operator releasing said locking means.

13. A portable tool for simultaneously terminating a plurality of conductors in a mass termination, insulation displacement connector positioned in a connector holder which is mounted on a wiring board or the like, said tool comprising:

a housing;

means for detachably mounting said tool on said connector holder;

a carriage having an insertion assembly for moving said conductors to terminate them in said connector; and a fluidic cylinder joined to said housing and having an elongate rod connected to reciprocate said insertion assembly; and a knee toggle linkage assembly connecting said rod to said carriage, said carriage including an elongate aperture extending transversely to the longitudinal direction of said rod, said linkage assembly including a drive link and a driven link with first ends thereof being pivotally connected to said rod and said housing, respectively, the second ends of said links being pivotally connected to one another, said linkage assembly pivotally carrying a roller for engagement with said carriage and having a pin disposed in said elongate aperture, said means for detachably mounting said tool comprising a pivotable latch mounted on a common pin with the first end of said driven link.

14. A tool as set forth in claim 13 wherein said linkage assembly is generally symmetrical and comprises a pair of drive links and a pair of driven links.

15. A tool as set forth in claim 13 wherein said carriage has a roller surface for engagement by the periphery of said roller and extending generally parallel to the longitudinal direction of said aperture.

16. A tool as set forth in claim 13 wherein said roller is carried by said driven link adjacent the second end thereof.

17. A tool as set forth in claim 13 wherein said detachable mounting means comprises a pivotable latch mounted on a common pin with the first end of said driven link.

* * * * *